US006475672B1

United States Patent
Iwata et al.

(10) Patent No.: US 6,475,672 B1
(45) Date of Patent: Nov. 5, 2002

(54) LITHIUM MANGANESE OXIDE, AND PROCESS FOR ITS PRODUCTION AND SECONDARY CELL EMPLOYING IT

(75) Inventors: Eiichi Iwata, Miyazaki (JP); Koji Maeda, Miyazaki (JP); Naoto Suzuki, Yamaguchi (JP); Yasushi Ohsaki, Miyazaki (JP); Takuya Kawaguchi, Yamaguchi (JP); Takashi Mori, Yamaguchi (JP)

(73) Assignee: Tosoh Corporation, Shinnanyo (JP)

( * ) Notice: Subject to any disclaimer, the term of this patent is extended or adjusted under 35 U.S.C. 154(b) by 131 days.

(21) Appl. No.: 09/672,313

(22) Filed: Sep. 29, 2000

(30) Foreign Application Priority Data

| Oct. 1, 1999 | (JP) | 11-281622 |
| Oct. 1, 1999 | (JP) | 11-281623 |
| Oct. 1, 1999 | (JP) | 11-281624 |
| Oct. 1, 1999 | (JP) | 11-281625 |
| Oct. 1, 1999 | (JP) | 11-281626 |

(51) Int. Cl.$^7$ .......................... H01M 4/50; H01M 4/58; C01G 45/12
(52) U.S. Cl. .................. 429/224; 423/599; 429/231.95
(58) Field of Search .................. 429/231.95, 224, 429/218.1; 423/599

(56) References Cited

U.S. PATENT DOCUMENTS

| 5,700,597 A | * | 12/1997 | Zhong et al. | 429/218 |
| 5,807,646 A | | 9/1998 | Iwata et al. | 429/224 |
| 5,869,208 A | * | 2/1999 | Miyasaka | 429/224 |
| 5,955,052 A | * | 9/1999 | Padhi et al. | 423/599 |
| 6,168,888 B1 | | 1/2001 | Iwata et al. | 429/231.95 |
| 6,280,699 B1 | * | 8/2001 | Manev et al. | 423/599 |
| 6,300,008 B1 | * | 10/2001 | Iijima et al. | 429/217 |
| 6,322,744 B1 | * | 11/2001 | Kelley et al. | 264/446 |

* cited by examiner

*Primary Examiner*—Wayne A. Langel
*Assistant Examiner*—Jonas N. Strickland
(74) *Attorney, Agent, or Firm*—Oblon, Spivak, McClelland, Maier & Neustadt, P.C.

(57) ABSTRACT

A lithium manganese oxide having a cubic crystal spinel structure, which has a composition represented by {Li} [$Li_xMn_{2-x}$]$O_4$ wherein { } represents 8a site, [ ] represents 16d site, and $0.08 < x \leq 0.15$, wherein the lattice constant (a) (unit: angstrom) of the cubic crystal is represented by the following formula:

$$a \leq 8.2476 - 0.25 \times x.$$

25 Claims, 2 Drawing Sheets

LITHIUM MANGANESE OXIDE, AND PROCESS FOR ITS PRODUCTION AND SECONDARY CELL EMPLOYING IT

BACKGROUND OF THE INVENTION

1. Field of the Invention

The present invention relates to a lithium manganese oxide having a spinel structure, and a process for its production and a lithium secondary cell employing it.

Manganese oxide is a material which has been used from long ago as a cell active material, and a lithium manganese composite oxide which is a composite material of manganese and lithium, is a material which has attracted an attention in recent years as a positive electrode active material for a lithium secondary cell.

2. Discussion of Background

A lithium secondary cell has attracted an attention as a new high performance cell along with miniaturization and light weight of electronic devices in recent years, because of its high energy density and high output.

The positive electrode material for a lithium secondary cell is required to have a high voltage-operational range, a high discharge capacity and a high cycle stability, and composite oxides of Li with various metals such as Co, Ni, Mn, V, etc. are being studied. $LiMn_2O_4$ having a spinel structure, which is one of composite oxides of Li and Mn, is considered to be prospective as a positive electrode active material, but it has a problem that it can hardly be reversibly cycled over a long period of time, and the electrochemical capacity of such a cell gradually decreases. Especially when it is operated under a high temperature condition of from 50 to 60° C., the reduction of the electrochemical capacity has been found remarkable.

Further, since it is a composite oxide of Li and Mn, there will be a problem that the composition tends to fluctuate when a lithium manganese oxide having a spinel structure is prepared, which in turn adversely affect the cell performance when the lithium manganese oxide having a spinel structure is used as a positive electrode for a lithium secondary cell. Various proposals have been made for a production method to increase the uniformity such as a liquid phase synthesis. However, their practical application has been difficult for such reasons that the starting material are expensive, the reaction is vigorous, and the apparatus is expensive.

SUMMARY OF THE INVENTION

It is an object of the present invention is to provide a high performance lithium manganese oxide having a spinel structure excellent in cycle stability for a long period of time as a positive material for a Li secondary cell, and a process for its production whereby a lithium manganese oxide having a spinel structure, having a high uniformity, can be obtained by a solid phase reaction employing inexpensive starting materials, and a high performance lithium secondary cell employing it.

As a result of an extensive study by the present inventors, it has been found that the above object can be accomplished by a lithium manganese oxide having a spinel structure (Fd 3m), which is represented by general formula $\{Li\}[Li_xMn_{2-x}]O_4$, wherein $\{\ \}$ represents 8a site, [ ] represents 16d site, and $0.00<x\leq0.50$, and which has a Na content of at most 0.1 wt % and an average primary particle size of from 0.5 to 2.0 μm as observed by SEM.

Further, it has been found that the above object can be accomplished by a process for producing a lithium manganese oxide having a spinel structure, which comprises mixing a lithium material and a manganese material, followed by calcination, wherein the ratio of the average particle size of the lithium material to that of the manganese material is from 1/5 to 1/30, as a process for producing a lithium manganese oxide having a spinel structure of the present invention.

As another process, it has been found that the above object can be accomplished by a process for producing a lithium manganese oxide having a spinel structure, which comprises mixing a lithium material and a manganese material, followed by calcination, wherein mixing of the lithium material and the manganese material is carried out while cooling.

As still another process, it has been found that the above object can be accomplished by a process for producing a lithium manganese oxide having a spinel structure, which comprises.mixing a lithium material and a manganese material, followed by calcination, wherein provisional heat treatment at a temperature of lower than 900° C., main heat treatment at a temperature of from 750 to 950° C., and further post heat treatment at a temperature of from 600 to 900° C., are carried out.

Further, a high performance lithium secondary cell employing the lithium manganese oxide having a spinel structure of the present invention as a positive electrode active material, has been found. The present invention has been accomplished on the basis of these discoveries.

DETAILED DESCRIPTION OF THE PREFERRED EMBODIMENTS

Figure 1:
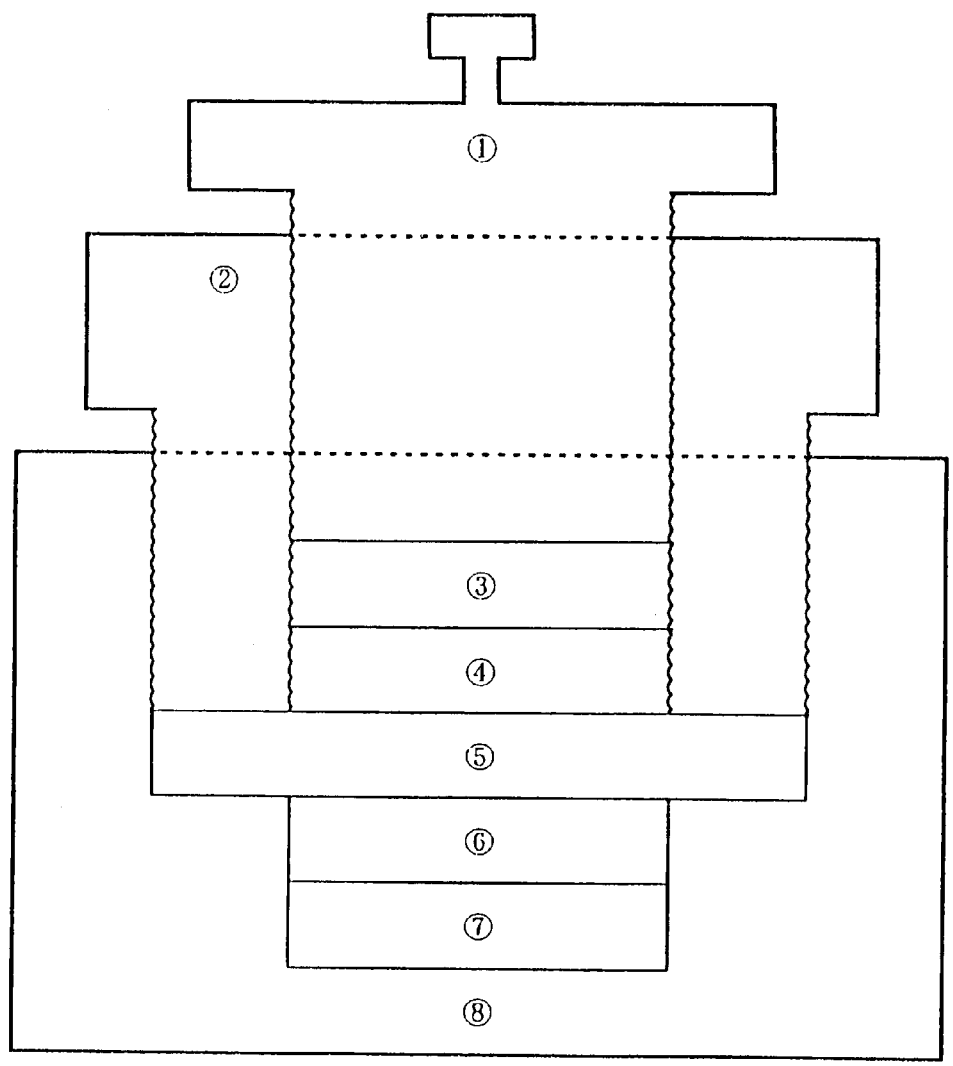
FIG. 1 shows a cell prepared by using the lithium manganese oxide having a spinel structure of the present invention as a positive electrode.

Now, the present invention will be described in detail.

The lithium manganese oxide having a spinel structure of the present invention is represented by the general formula $\{Li\}[Li_xMn_{2-x}]O_4$, wherein $\{\ \}$ represents 8a site, [ ] represents 16d site, and $0.00<x\leq0.50$, and Li is present at the 8a site and the 16d site, and Mn is present at the 16d site.

Here, the value of x in the formula is preferably $0.08<x\leq0.15$.

If the value x is less than 0.08, the cycle stability of the formed lithium manganese oxide having a spinel structure tends to be poor, and if it exceeds 0.15, the useful electric capacity tends to be small, such being disadvantageous.

The value x is more preferably $0.09\leq x\leq 0.12$.

The lithium manganese oxide having a spinel structure of the present invention has a cubic crystal spinel structure showing an X-ray diffraction pattern which is close to the pattern of JCPDS35-782, and it has a feature that the lattice constant (a) satisfies the following formula:

$$a\leq 8.2476-0.25\times x$$

If the lattice constant is larger than the above value, the cycle stability tends to be poor, such being undesirable.

The lithium manganese oxide having a spinel structure of the present invention preferably has a Na content of from 0.001 to 0.1 wt %.

If the Na content exceeds 0.1 wt %, when used as a positive electrode material, such a lithium manganese oxide tends to cause contamination of e.g. the negative electrode, such being undesirable.

More preferably, the Na content is at most 0.05 wt %.

It is preferred that the lithium manganese oxide having a spinel structure of the present invention has an average primary particle size of from 0.5 to 2.0 μm as observed by SEM.

In the present invention, the average primary particle size as observed by SEM is an average value of circle-simulated diameters obtained by an image analysis of a SEM observation image photograph of the powder.

If such an average primary particle size is smaller than 0.5 μm, the stability in the electrolyte tends to be poor, and if it exceeds 2.0 μm, the electric capacity tends to be small, and in either case, no high performance as a cell active material can be attained.

The average primary particle size is preferably from 0.8 to 1.2 μm.

The lithium manganese oxide having a spinel structure of the present invention preferably has a BET specific surface area of from 0.1 to 2.0 m$^2$/g.

If the BET specific surface area is smaller than 0.1 m$^2$/g, the useful electric capacity tends to be low, such being undesirable. On the other hand, if it exceeds 2.0 m$^2$/g, a large amount of a solvent will be required at the time of slurrying the active material, the conductive material, etc. to prepare an electrode sheet, and the viscosity of the prepared slurry tends to be high, thus causing a trouble during the preparation of a positive electrode for a cell, such being undesirable.

More preferably, the BET specific surface area is from 0.3 to 1.0 m$^2$/g.

In the process for producing a lithium manganese oxide having a spinel structure of the present invention, as the manganese material, it is preferred to employ a manganese material having an average particle size of at most 30 μm.

Here, the average particle size is a volume-calculated 50% diameter ($d_{50}$) as measured by a microtrack method.

As a manganese material, it is preferred to employ $Mn_2O_3$ having a BET specific surface area within a range of from 0.5 to 10 m$^2$/g.

Further, as a manganese material, electrolytic manganese dioxide is preferred, since the uniformity of the primary particles is high, and one having an average particle size of at most 30 μm is preferred since the reactivity is good.

Further, as a manganese material, it is preferred to use a manganese oxide having substantially a single crystal phase, obtained by heat treatment of electrolytic manganese dioxide having an average particle size of at most 30 μm, since the crystal phase will also be uniform, and the reaction with the lithium material will be uniform. It is also preferred to use, as a manganese material, electrolytic manganese dioxide having a Na content of at most 0.1 wt %.

Electrolytic manganese dioxide is preferred in that as compared with other manganese oxides and compounds, the resulting lithium manganese oxide having a spinel structure tends to be dense, and the average primary particle size tends to be large. However, the cell performance of the resulting lithium manganese oxide having a spinel structure is likely to be low.

The present inventors have conducted an extensive study and as a result, it has been made possible to obtain a lithium manganese oxide having a spinel structure having a large average primary particle size with a less deterioration of the cell performance, by using electrolytic manganese dioxide having a Na content of at most 0.1 wt %, as the Mn material.

The Na content is preferably at most 0.05 wt %, particularly preferably at most 0.02 wt %.

It is common to carry out electrolysis in a sulfuric acid bath to obtain electrolytic manganese dioxide and to carry out neutralization treatment with a sodium hydroxide aqueous solution after the electrolysis, which is the cause for an increase of the Na content.

The electrolytic manganese dioxide having a Na content of at most 0.1 wt %, can be obtained by washing with water or hot water without carrying out the neutralization. treatment after the electrolysis, or by carrying out the neutralization treatment with an aqueous lithium hydroxide solution, an aqueous ammonia solution or an aqueous amine solution.

In order to remove the deposited or contained sulfuric acid content from the electrolytic bath, it is preferred to carry out washing and neutralization of the formed electrolytic manganese dioxide in combination.

Further, the present inventors have found that the reaction with the Li material will proceed uniformly by using, as a manganese material, a manganese oxide having substantially a single crystal phase, obtained by heat-treating electrolytic manganese dioxide.

Namely, it is preferred to employ, as a manganese material, a manganese oxide having substantially a single crystal phase, obtained by heat-treating electrolytic manganese dioxide having a Na content of at most 0.1 wt %.

It is also preferred that instead of using electrolytic manganese dioxide having a Na content of at most 0.1 wt %, manganese oxide obtained by heat treating electrolytic manganese dioxide is washed to obtain manganese oxide having substantially a single crystal phase having a Na content of at most 0.1 wt %, which is used as a manganese material.

The heat treatment of electrolytic manganese dioxide is preferably carried out in the atmospheric air at a temperature of from 600 to 1,100° C.

As the above-mentioned manganese oxide obtained by heat-treating electrolytic manganese dioxide is preferably one having substantially a $Mn_2O_3$ single phase or a $Mn_3O_4$ single phase. Particularly, $Mn_2O_3$ is preferred since the valence of Mn is close to the valence of Mn in $LiMn_2O_4$. The BET specific surface area of the above manganese compound is preferably at most 20 m$^2$/g from the viewpoint of the reactivity and the handling efficiency.

As the Li compound, a carbonate, a nitrate, a chloride, a hydroxide, an oxide, etc., may, for example, be mentioned. Lithium carbonate having a BET specific surface area of at least 1 m$^2$/g is particularly preferred, since the reactivity is good, and the hygroscopicity is low.

When lithium carbonate is to be used, the average particle size is preferably at most 5 μm, particularly preferably at most 2 μm.

If this average particle size exceeds 5 μm, the reactivity of lithium carbonate tends to be poor, such being undesirable.

For mixing the starting materials, any conventional method may be employed so long as uniform mixing can be done. It is also preferred to carry out heat treatment while mixing, such as treatment by a rotary kiln. In the present invention, it is preferred that after mixing the lithium compound and the manganese oxide prepared as described above, provisional heat treatment of maintaining the mixture at a temperature of less than 900° C. is carried out at least once, remixing is carried out, and then, main heat treatment of holding the mixture at a temperature of from 750 to 950° C. is carried out, whereby the uniformity can further be improved.

Further, in order to reduce oxygen deficiency and structural defects of the product, it is preferred that after the main heat treatment of holding the mixture at a temperature of from 750 to 950° C., post heat treatment of holding the mixture at a temperature of from 600 to 900° C. in an oxygen-containing atmosphere, is carried out.

The above-mentioned post heat treatment is more preferably carried out in such a manner that after the main heat treatment of holding the mixture at a temperature of from 750 to 950° C., post heat treatment of holding the mixture at a temperature of from 600 to 900° C. is carried out continuously in an oxygen-containing atmosphere. More preferably, such post treatment is carried out a plurality of times.

It is preferred that heat treatments are all carried out in an oxygen-containing atmosphere.

If the heat treating conditions are outside the above ranges, the average primary particle size of the product tends to be outside the desired range, and oxygen deficiency or structural defects are likely to result, such being undesirable.

The lithium manganese oxide having a spinel structure thus prepared, may be subjected to pulverization and classification as the case requires.

By the above-described process, the lithium manganese oxide having a spinel structure of the present invention can be prepared.

As a result of an extensive study by the present inventors, it has been found that the above object can also be accomplished by a process for producing a lithium manganese oxide having a spinel structure, which comprises mixing a lithium material and a manganese material, followed by calcination, wherein the ratio of the average particle size of the lithium material to that of the manganese material is from 1/5 to 1/30.

In the process of the present invention, if the average particle size of lithium carbonate is larger than 5 $\mu$m, the reactivity of lithium carbonate tends to be poor, such being undesirable.

As the lithium material, lithium carbonate having an average particle size of at most 2 $\mu$m is preferred.

As the manganese material of the present invention, it is preferred to use a manganese material having an average particle size of at most 30 $\mu$m.

Among manganese materials, electrolytic manganese dioxide is preferred since the uniformity of the primary particles is high, and one having an average particle size of at most 30 $\mu$m is preferred, since the reactivity is good.

Further, it is preferred to use, as a manganese material, a manganese oxide made substantially of a single crystal phase, obtained by heat-treating electrolytic manganese dioxide having an average particle size of at most 30 $\mu$m, since the crystal phase will be uniform, and the reaction with the lithium material tends to be uniform.

Further, in the process for producing the lithium manganese oxide having a spinel structure of the present invention, it is preferred to mix the lithium material and the manganese material under cooling or to prepare a granulated product after mixing, under cooling. If mixing is carried out without cooling as conducted in the present invention, the starting materials are likely to undergo modification by the heat generated during the mixing, whereby it tends to be difficult to mix the lithium material and the manganese material uniformly.

For the cooling, any conventional method may be employed, and. the temperature during the mixing is preferably at most 30° C.

In the present invention, it is preferred to carry out the mixing by a stirring mixer in order to improve the uniformity. However, any conventional method may be employed so long as the starting materials can be uniformly mixed, and it is also preferred to carry out heat treatment while mixing, such as treatment by e.g. a rotary kiln.

In the process for producing a granulated product of the lithium manganese oxide having a spinel structure of the present invention, it is preferred that after mixing the lithium material and the manganese material, the granulated product is prepared under cooling.

Usually, if after the mixing, the mixed powder is granulated or molded, handling will be easy as compared with a powder.

By preparing a granulated product under cooling as in the present invention, a uniform mixed powder can be granulated, and further if heat treatment is carried out, the reaction will proceed uniformly, such being desirable.

Further, a Li secondary cell employing the lithium manganese oxide having a spinel structure of the present invention as a positive electrode active material, has been prepared.

As the negative electrode active material to be used for the Li secondary cell of the present invention, metal lithium, a lithium alloy or a material capable of absorbing and desorbing lithium ions may be used. For example, metal lithium, a lithium/aluminum alloy, a lithium/tin alloy, a lithium/lead alloy or a carbon material capable of electrochemically absorbing and desorbing lithium ions may be mentioned. From the viewpoint of the safety and the characteristics of the cell, a carbon material capable of electrochemically absorbing and desorbing lithium ions is particularly preferred.

The electrolyte to be used for the Li secondary cell of the present invention is not particularly limited. For example, one having a lithium salt dissolved in an organic solvent such as a carbonate, a sulfolane, a lactone or a lithium ion conductive solid electrolyte may be employed.

The separator to be used for the Li secondary cell of the present invention is not particularly limited. For example, a microporous film made of polyethylene or polypropylene may be employed.

Using the lithium manganese oxide having a spinel structure of the present invention as a positive electrode active material, a cell as shown in FIG. 1 was prepared.

In the Figure, ① represents a cover, ② an insulator made of Teflon, ③ a negative electrode current collector mesh, ④ a negative electrode, ⑤ a separator, ⑥ a positive electrode, ⑦ a positive electrode current collector mesh, and ⑧ a container.

According to the present invention, a stable high performance Li secondary cell was obtained by using the above-described positive electrode active material, negative electrode active material and lithium salt-containing non-aqueous electrolyte.

Now, the present invention will be described in further detail with reference to Examples and Comparative Examples. However, it should be understood that the present invention is by no means restricted by such specific Examples.

Various measurements in the following Examples and Comparative Examples were carried out under the following conditions.

The XRD pattern was measured under the following conditions.

Measuring apparatus: MXP-3, manufactured by Macscience Co.
Irradiated X-ray: CuK $\alpha$ ray
Measuring mode: Step scanning Scanning condition: 0.04 degree/sec.

Measuring time: 3 sec.

Measuring range: from 5 degree to 80 degree at 2θ

The analysis of the composition was carried out by an ICP spectrometry.

Preparation of a Lithium Manganese Oxide Having a Spinel Structure

As Examples and Comparative Examples, the preparation was carried out as follows.

EXAMPLE 1

$MnO_2$ (electrolytic manganese dioxide, manufactured by TOSOH CORPORATION) having a BET specific surface area of 40 $m^2/g$ and an average agglomerated particle size of 15 μm, was heat-treated at 900° C. for 12 hours in the atmospheric air. The X-ray diffraction pattern of the obtained compound was similar to the pattern of $Mn_2O_3$ of JCPDS card: 41-1442. Further, the BET specific surface area was 1 $m^2/g$. This $Mn_2O_3$ and lithium carbonate ($Li_2CO_3$) having a BET specific surface area of 3 $m^2/g$, were weighed so that the ratio of Li to Mn would be Li/Mn=0.58 and thoroughly mixed in a mortar. Then, the mixture was heat-treated at 450° C. for 6 hours in the atmospheric air and again mixed, followed by heat treatment at 900° C. for 24 hours in oxygen.

From the X-ray diffraction pattern, the obtained compound was found to have a spinel structure of a single phase cubic crystal.

Figure 2:
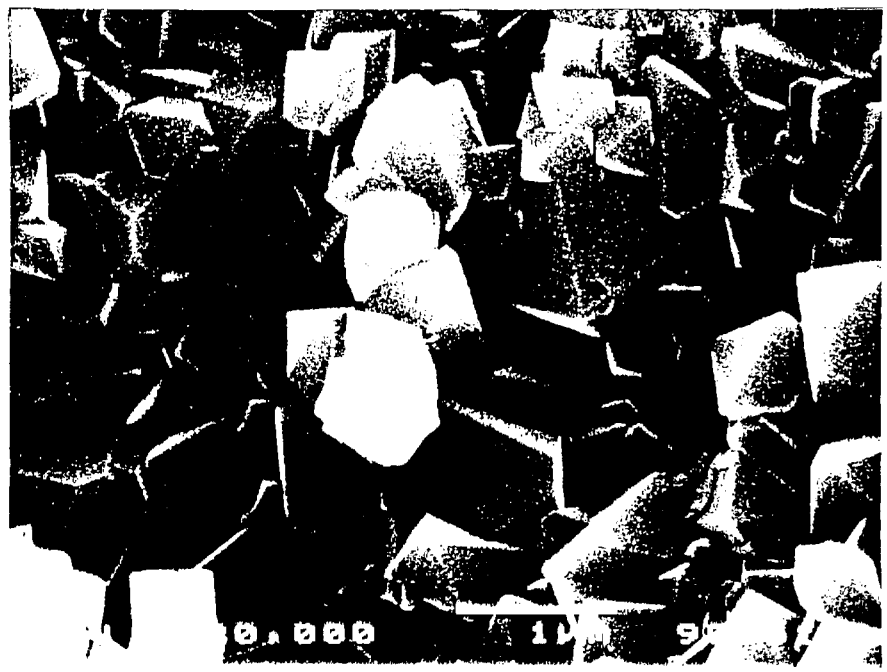
FIG. 2 is a photograph showing the particle structure of the lithium manganese oxide having a spinel structure obtained in Example 1.

The BET specific surface area was 0.5 $m^2/g$, and the primary particle size was from 0.7 to 1.5 μm. Further, the particle structure of the obtained compound was observed by SEM with 20,000 magnifications, and the photograph thereby obtained is shown in FIG. 2.

It was found that the sizes of particles of the lithium manganese oxide having a spinel structure in the photograph were within a range of from 0.5 to 2 μm.

EXAMPLE 2

The preparation was carried out under the same conditions as in Example 1 except that $Mn_2O_3$ and the lithium compound were heat-treated at 450° C. for 6 hours in the atmospheric air, again mixed and then heat-treated at 900° C. for 24 hours.

EXAMPLE 3

The preparation was carried out under the same conditions as in Example 1 except that the heat treatment of $MnO_2$ was carried out at 600° C.

EXAMPLE 4

The preparation was carried out under the same conditions as in Example 1 except that $Mn_2O_3$ and the lithium compound were heat-treated at 600° C. for 6 hours in the atmospheric air, again mixed and then heat-treated at 900° C. for 24 hours in oxygen.

Comparative Example 1

The preparation was carried out under the same conditions as in Example 1 except that as the Mn material, $MnO_2$ (electrolytic manganese dioxide, manufactured by TOSOH CORPORATION) was used without subjecting it to heat treatment.

Figure 3:
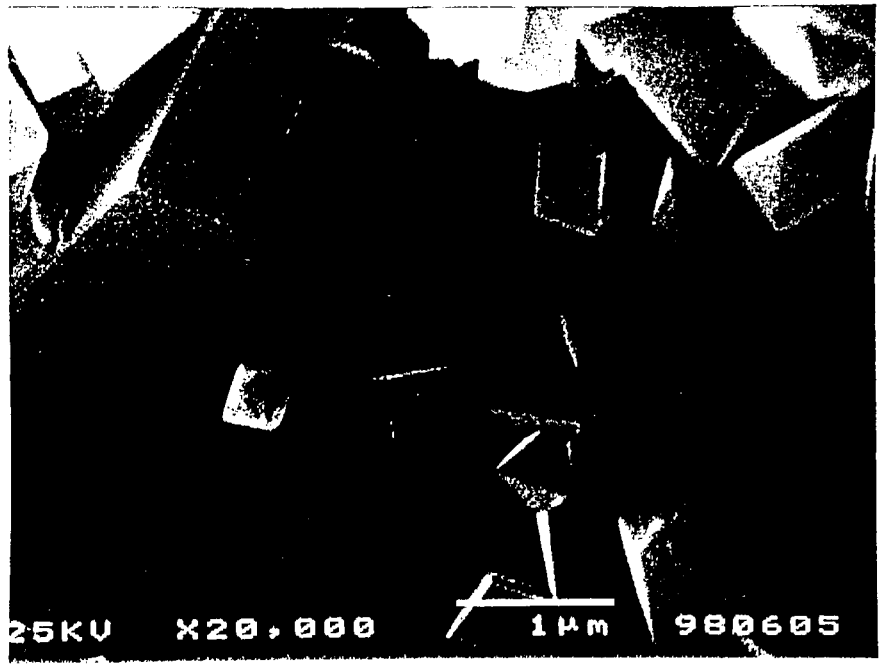
FIG. 3 is a photograph showing the particle structure of the lithium manganese oxide having a spinel structure obtained in Comparative Example 1.

The particle structure of the obtained compound was observed by SEM with 20,000 magnifications, and the photograph thereby obtained is shown in FIG. 3.

In the lefthand side half of the photograph, large particles of lithium manganese oxide having a spinel structure at a level of 10 μm are present.

Comparative Example 2

The preparation was carried out in the same manner as in Example 1 except that the final heat treating temperature was changed to 750° C.

Construction of a Cell

Using the lithium manganese oxides obtained in Examples and Comparative Examples, cell tests were carried out. For the cell test, a sample and a mixture of conductive polytetrafluoroethylene and acetylene black (tradename: TAB-2) were mixed in a weight ratio of 2:1. the mixture was molded under a pressure of 1 ton/$cm^2$ in a pellet shape on a mesh (SUS 316) and then dried under reduced pressure at 200° C. for 24 hours.

A pellet thus obtained was used as a positive electrode ⑥ in FIG. 1, and as a negative electrode ④ in FIG. 1, a lithium piece cut out from a lithium foil (thickness: 0.2 mm) was used. As an electrolyte, a solution having lithium phosphate hexafluoride dissolved in a concentration of 1 mol/$dm^3$ in a solvent mixture of propylene carbonate and diethyl carbonate, was impregnated to a separator ⑤ in FIG. 1. Further, for the negative electrode, a carbon material capable of electrochemically absorbing and desorbing lithium ions was used, and a cell as shown in FIG. 1 was constructed.

Evaluation of Cell Characteristics

Cells were prepared by using lithium manganese oxides prepared in Examples and Comparative Examples as positive electrode active materials, and at a constant current of 1.0 mA/$cm^2$, charging and discharging were repeated within a cell voltage of from 4.5V to 3.5V. The tests were carried out at room temperature and 50° C.

In Table 1, the initial capacity and the capacity-maintaining rate (% of the discharge capacity of the 50th cycle to the 10th cycle) are shown.

TABLE 1

| | BET | Primary particle size | Initial capacity | Capacity-maintaining rate (%) | |
|---|---|---|---|---|---|
| | ($m^2/g$) | (μm) | (mAh/g) | Room temp. | 50° C. |
| Example 1 | 0.5 | 0.7–1.5 | 103 | 99.97 | 99.91 |
| Example 2 | 0.4 | 1.0–2.0 | 106 | 99.96 | 99.90 |
| Example 3 | 0.7 | 0.5–1.5 | 107 | 99.95 | 99.88 |
| Example 4 | 0.5 | 0.7–1.5 | 105 | 99.98 | 99.92 |
| Comparative Example 1 | 0.4 | 1.0–10 | 102 | 99.94 | 99.64 |
| Comparative Example 2 | 1.2 | 0.1–0.5 | 90 | 99.85 | 99.60 |

EXAMPLE 5

Electrolytic manganese dioxide having an average particle size of 15 μm and a Na content of 0.01 wt % was heat-treated at 800° C. for 12 hours in the atmospheric air, to obtain $Mn_2O_3$ showing a pattern similar to JCPDS card: 41-1442. This $Mn_2O_3$ and lithium carbonate having an average particle size of 2 μm and a BET specific surface area of 3 $m^2/g$, were weighed so that the Li/Mn ratio would be 0.58, and mixed. The mixing was carried out by means of an agitation granulator (FM-VG-50, manufactured by POWREX Co.) under cooling at 25° C. by circulating water to the jacket. The mixture thus obtained was subjected to provisional heat treatment at 600° C. for 6 hours in the atmospheric air, then cooled to room temperature, again mixed and subjected to main heat treatment at 800° C. for 24 hours in the atmospheric air and further to post heat treatment at 700° C. for 24 hours in the atmospheric air.

The product showed a diffraction pattern by powder X-ray diffraction similar to JCPDS35-782 (LiMn$_2$O$_4$: lattice constant: 8.24762 Å) and was identified to be a cubic crystal spinel (lattice constant: 8.220 Å) slightly different in the lattice constant. By the ICP spectrometry, the chemical composition was found to be {Li}[Li$_{0.1}$Mn$_{1.9}$]O$_4$, and the Na content was found to be 0.01 wt %.

Further, as a result of the SEM observation, this product was found to form agglomerates in which crystal particles (primary particles) of about 0.7 μm are uniformly present, and the BET specific surface area was 0.7 m$^2$/g.

The following cell using the lithium manganese oxide thus obtained as a positive electrode, was prepared, and the positive electrode characteristic test was carried out. A positive electrode sample and a mixture of polytetrafluoroethylene and acetylene black (tradename: TAB-2) were mixed in a weight ratio of 2:1 and molded under a pressure of 1 ton/cm$^2$ in a pellet-shape on a mesh made of SUS 316 and then dried under reduced pressure at 200° C. for 24 hours. The obtained product was used as a positive electrode of a cell, and as a negative electrode, a metal lithium foil (thickness: 0.2 mm) was used. As an electrolyte, a solution having lithium phosphate hexafluoride (LiPF$_6$) dissolved in a concentration of 1 mol/dm$^3$ in a solvent mixture of propylene carbonate and a diethyl carbonate, was impregnated to a separator, and a cell was constructed.

Using the cell thus prepared, charge and discharge were repeated at a constant current of 1.0 mA/cm$^2$ within a cell voltage of from 4.5V to 3.5V at a test temperature of 50° C. As a result, the capacity-maintaining ratio (% of the discharge capacity of the 50th cycle to the 10th cycle) was 95%.

EXAMPLE 6

The preparation and evaluation of the cell were carried out in the same manner as in Example 5 except that as the heat treating conditions for the preparation, provisional heat treatment was carried out at 600° C. for 6 hours in the atmospheric air, after cooling to room temperature, mixing was carried out again, and main heat treatment was carried out at 900° C. for 24 hours in the atmospheric air, and further post heat treatment was carried out at 800° C. for 24 hours in the atmospheric air.

By the powder X-ray diffraction, the product was identified to be cubic crystal spinel (lattice constant: 8.222 Å), and by the ICP spectrometry, the chemical composition was found to be {Li}[Li$_{0.1}$Mn$_{1.9}$]O$_4$, and the Na content was found to be 0.01 wt %. Further, as a result of the SEM observation, the product was found to form agglomerates in which crystal particles (primary particles) of about 0.8 μm were uniformly present, and the BET specific surface area was 0.4 m$^2$/g.

Further, as a result of the cell test, the capacity-maintaining rate (% of the discharge capacity of the 50th cycle to the 10th cycle) was 92%.

EXAMPLE 7

The preparation and evaluation of the cell were carried out in the same manner as in Example 5 except that as a mixing condition for the preparation, a 2 wt % polyvinyl alcohol aqueous solution was added and stirred for 15 minutes for granulation. At the termination of the granulation, most of the product was in the form of granules having a diameter of from 1 to 5 mm, and the compositional deviation by random sampling of the granules was within 1%.

The product thus obtained showed the same physical properties and cell characteristics as in Example 5.

Comparative Example 3

The preparation was carried out under the same conditions as in Example 5 except that the Na content of electrolytic manganese dioxide used as a Mn material was 0.2 wt %.

As a result, the crystal phase and the composition were the same, but the lattice constant was slightly small at a level of 8.218 Å, and the powder physical properties were different with an average primary particle size of 1.0 μm and a BET specific surface area of 0.9 m$^2$/g. As a result of the cell test, the capacity-maintaining rate was 85%, which was remarkably inferior as compared with Example 5.

Comparative Example 4

The preparation was carried out under the same conditions as in Example 6 except that the Na content of electrolytic manganese dioxide used as a Mn material was 0.2 wt %.

As a result, the crystal phase and the composition were the same, but the lattice constant was slightly small at a level of 8.220 Å, and the powder physical properties were different with an average primary particle size of 1.2 μm and a BET specific surface area of 1.2 m$^2$/g. As a result of the cell test, the capacity-maintaining rate was 80%, which was remarkably inferior as compared with Example 6.

Comparative Example 5

The preparation was carried out under the same conditions as in Example 5 and Example 6 except that in the process for the preparation, no post heat treatment was carried out after the main heat treatment.

As a result, although the crystal phases were the same, the lattice constants were respectively larger than the Example 5 and 6. Further, as a result of the chemical analyses, the average oxidation numbers of Mn were smaller than the theoretically calculated values, and it was considered that oxygen defects were present. The cell performance of these products was remarkably inferior as compared with Examples 5 and 6.

Comparative Example 6

The preparation was carried out under the same conditions as in Example 5 except that lithium carbonate having an average particle size of 10 μm was employed as a Li material.

As a result, when lithium carbonate having an average particle size of 10 μm was employed, it was impossible to obtain a single phase even by the heat treatment at 700° C., while in Example 1 wherein lithium carbonate having an average particle size of 2 μm was employed, a single phase of cubic crystal spinel was obtained by the provisional heat treatment at 600° C. for 6 hours in the atmospheric air. Further, by the main heat treatment at 800° C., a cubic crystal spinel single phase was formed, but the sizes of crystal primary particles, as observed by SEM, were not uniform, and it was considered that the reaction took place non-uniformly. Thus, the cell performance of the product was substantially inferior as compared with Example 1.

Comparative Example 7

The preparation was carried out under the same conditions as in Examples 5 and 7 except that no circulation of water to the jacket for cooling was carried out at the time of mixing the Li material and the Mn material.

As a result, the temperature at the termination of the mixing increased to 45° C., and it was confirmed that white powder of lithium carbonate was deposited on the inner wall of the mixer. As a result of the compositional analysis by random sampling, the deviation from the charged composition reached 3%. Further, in a case where stirring granulation was carried out by an addition of a 2 wt % polyvinyl alcohol aqueous solution, a firm deposit was found on the inner wall of the mixer, whereby uniform granulated products were not obtained.

TABLE 2

| | Na content (wt %) | $SO_4$ (wt %) | Compositional formula | Average primary particle size (μm) | Lattice constant (Å) | BET specific surface area (m²/g) | Capacity-maintaining rate (%) |
|---|---|---|---|---|---|---|---|
| Example 4 | 0.01 | 1 | {Li} [Li$_{0.1}$Mn$_{1.9}$]O$_4$ | 0.7 | 8.220 | 0.7 | 95 |
| Example 5 | 0.01 | 1 | {Li} [Li$_{0.1}$Mn$_{1.9}$]O$_4$ | 0.8 | 8.222 | 0.4 | 92 |
| Comparative Example 3 | 0.2 | 1 | {Li} [Li$_{0.1}$Mn$_{1.9}$]O$_4$ | 1.0 | 8.218 | 0.9 | 85 |
| Comparative Example 4 | 0.2 | 1 | {Li} [Li$_{0.1}$Mn$_{1.9}$]O$_4$ | 1.2 | 8.220 | 0.3 | 80 |

What is claimed is:

1. A lithium manganese oxide having a cubic crystal spinel structure, which has a composition represented by {Li}(Li$_x$Mn$_{2-x}$)O$_4$;

wherein { } represents a 8a site, ( ) represents a 16d site, and $0.00 < x \leq 0.50$;

wherein a lattice constant (a) of the cubic crystal is represented by the following formula:

$$a \leq 8.2476 - 0.25 \times x;$$

wherein said lattice constant (a) is represented in the unit angstrom;

wherein an average primary particle size of said lithium manganese oxide is from 1.2 to 2.0 μm as observed by SEM.

2. The lithium manganese oxide according to claim 1, wherein the value of x is $0.08 < x \leq 0.15$.

3. The lithium manganese oxide according to claim 1, wherein the value of x is $0.09 < x \leq 0.12$.

4. The lithium manganese oxide having a spinel structure according to claim 1, wherein the content of Na as an impurity is from 0.001 to 0.1 wt %.

5. The lithium manganese oxide having a spinel structure according to claim 4, wherein the content of Na as an impurity is from 0.001 to 0.05 wt %.

6. The lithium manganese oxide having a spinel structure according to claim 4, wherein the content of Na as an impurity is from 0.001 to 0.02 wt %.

7. The lithium manganese oxide having a spinel structure according to claim 1, which has a BET specific surface area of from 0.1 to 2.0 m²/g.

8. The lithium manganese oxide having a spinel structure according to claim 7, which has a BET specific surface area. of from 0.3 to less than 1.0 m²/g.

9. A process for producing the lithium manganese oxide having a spinel structure as defined in claim 1, which comprises mixing a lithium compound and a manganese oxide, followed by calcination, wherein after mixing said manganese oxide and said lithium compound, provisional heat treatment at a temperature of lower than 900° C. is carried out at least once, remixing is carried out, and then, main heat treatment of holding the mixture at a temperature of from 750 to 950° C. is carried out at least once to obtain said lithium manganese oxide.

10. The process for producing the lithium manganese oxide having a spinel structure according to claim 9, wherein after the main heat treatment of holding the mixture at a temperature of from 750 to 950° C., post heat treatment of holding the mixture at a temperature of from 600 to 900° C. in an oxygen-containing atmosphere is carried out.

11. The process for producing the lithium manganese oxide having a spinel structure according to claim 9, wherein after the main heat treatment of holding the mixture at a temperature of from 750 to 950° C., post heat treatment of holding the mixture at a temperature of from 600 to 900° C. in an oxygen-containing atmosphere is carried out continuously.

12. The process for producing the lithium manganese oxide having a spinel structure according to claim 9, wherein after the main heat treatment of holding the mixture at a temperature of from 750 to 950° C., post heat treatment of holding the mixture at a temperature of from 600 to 900° C. in an oxygen-containing atmosphere is carried out a plurality of times.

13. The process for producing the lithium manganese oxide having a spinel structure according to claim 9, wherein heat treatments are all carried out in an oxygen-containing atmosphere.

14. The process for producing the lithium manganese oxide having a spinel structure according to claim 9, wherein the ratio of the average particle size of the lithium compound to that of the manganese oxide is from 1/5 to 1/30.

15. The process for producing the lithium manganese oxide having a spinel structure according to claim 14, wherein the lithium compound and the manganese oxide are stirred and mixed at a temperature of at most 30° C.

16. The process for producing the lithium manganese oxide having a spinel structure according to claim 15, wherein the lithium compound and the manganese oxide are stirred and mixed at a temperature of at most 30° C. to prepare a granulated product.

17. The process for producing the lithium manganese oxide having a spinel structure according to claim 14, wherein lithium carbonate having an average particle size of at most 5 μm is used as the lithium compound.

18. The process for producing the lithium manganese oxide having a spinel structure according to claim 17, wherein lithium carbonate having an average particle size of at most 2 μm is used as the lithium compound.

19. The process for producing the lithium manganese oxide having a spinel structure according to claim 14, wherein a manganese oxide having an average particle size of at most 30 μm is used.

20. The process for producing the lithium manganese oxide having a spinel structure according to claim 14, wherein $Mn_2O_3$ having a BET specific surface area within a range of from 0.5 to 10 m$^2$/g is used as the manganese oxide.

21. The process for producing the lithium manganese oxide having a spinel structure according to claim 14, wherein manganese oxide made substantially of a $Mn_2O_3$ single crystal phase or a $Mn_3O_4$ single crystal phase, obtained by heat-treating electrolytic manganese dioxide having a Na content of at most 0.1 wt % at a temperature of from 600 to 1,100° C. in the atmospheric air, is used.

22. The process for producing the lithium manganese oxide having a spinel structure according to claim 14, wherein manganese oxide made substantially of a $Mn_2O_3$ single crystal phase or a $Mn_3O_4$ single crystal phase, obtained by heat-treating electrolytic manganese dioxide at a temperature of from 600 to 1,100° C. in the atmospheric air, is washed to bring the Na content to be at most 0.1 wt % and then used as the source of manganese oxide.

23. The process for producing the lithium manganese oxide having a spinel structure according to claim 14, wherein the ratio of the average particle size of the lithium compound to that of the manganese oxide is from 1/10 to 1/20.

24. A Li secondary cell, wherein the lithium manganese oxide having a spinel structure as defined in claim 1 is used as a positive electrode.

25. The Li secondary cell according to claim 24, wherein a carbon-type material capable of electrochemically absorbing and desorbing lithium ions is used as a negative electrode.

* * * * *